(12) United States Patent
Tsuchikiri et al.

(10) Patent No.: US 7,411,141 B2
(45) Date of Patent: Aug. 12, 2008

(54) COMBINATION SWITCH

(75) Inventors: Akihiko Tsuchikiri, Shizuoka (JP); Yujiro Mizuguchi, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 430 days.

(21) Appl. No.: 11/081,657

(22) Filed: Mar. 17, 2005

(65) Prior Publication Data

US 2006/0207864 A1    Sep. 21, 2006

(51) Int. Cl.
    *H01H 9/00* (2006.01)
(52) U.S. Cl. .................... 200/61.54; 200/332
(58) Field of Classification Search .......... 200/61.27, 200/61.3, 61.54, 17 R, 4, 18, 332, 335
    See application file for complete search history.

(56) References Cited

U.S. PATENT DOCUMENTS 3,996,433 A * 12/1976 Suzuki et al. ............ 200/61.27
6,448,670 B1 * 9/2002 Onodera et al. .......... 307/10.1
6,566,616 B1 * 5/2003 Ha ........................ 200/61.54

FOREIGN PATENT DOCUMENTS

| JP | 57-42091    | 9/1982 |
| JP | 11042958    | 2/1999 |
| JP | 20011243853 | 9/2001 |

* cited by examiner

*Primary Examiner*—Michael A Friedhofer
*Assistant Examiner*—Lisa N Klaus
(74) *Attorney, Agent, or Firm*—Sughrue Mion, PLLC

(57) ABSTRACT

A combination switch includes a combination switch body 1 fixed to a steering column of a vehicle, an operating lever 2 swingably mounted on the combination switch body 1, and a wiper switch for operating a wiper of the vehicle in accordance with a swing movement of the operating lever 2 relative to the combination switch body 1. An A/C switch 4, a fan switch 5 and a temperature control dial 6 for operating an air-conditioner are mounted on the operating lever 2.

6 Claims, 5 Drawing Sheets

COMBINATION SWITCH

BACKGROUND OF THE INVENTION

1. Technical Field

This invention relates to a combination switch mounted on a steering column of a vehicle.

2. Related Art

In a related art, a combination switch is fixed to a steering column of an automobile, and when an operating lever, extending from a body of the combination switch is swung in one direction (that is, a direction substantially parallel to a plane of angular movement of a steering handle), wipers are operated. When the operating lever is swung in another direction (that is, a direction substantially perpendicular to the one direction), a washer liquid is injected to a front glass.

Further, an operating thumb piece for operating a wiper provided on a rear glass of the car, an operating button for injecting washer liquid to the rear glass, etc., are formed on the operating lever. Thus, the switches, associated with the wiper operation, can be provided on the single operating lever, and this has enhanced the efficiency of manipulation for operating the wipers.

Incidentally, the operation of an air-conditioner in a car is effected, using an A/C switch for operating and stopping the air-conditioner, a fan switch for operating and stopping a fan, a temperature control device for controlling a temperature, etc., and these switches have usually been mounted on an instrument panel or its vicinity. With respect to air-conditioners, a manual air-conditioner, an automatic air-conditioner and a semi-automatic air-conditioner have come into wide use.

However, the operating switches for operating the air-conditioner are provided on the instrument panel or its vicinity, and when operating the air-conditioner during the travel of the car, the eyes must be directed much downward, which has invited a problem that it difficult to operate the air-conditioner during the travel of the car.

On the other hand, the operating switches for the rear wiper are provided on the combination switch, and therefore can be operated during the travel of the car without directing the eyes much downward. However, during the travel of the car, the operating switches for the rear wiper are lower in frequency of use than the operating switches for the air-conditioner, and therefore could not fully performed the effect of good manipulatability during the travel.

Moreover, some kinds of automobiles are not provided with a rear wiper, and two types of combination switches (that is, the type having a rear wiper-operating portion formed on an operating lever and the type having no such rear wiper-operating portion on an operating lever) need to be prepared at a production side. Therefore, there has been a disadvantage that the kinds of the combination switches increased. On the other hands, an air-conditioner has now been provided at almost all kinds of automobiles.

SUMMARY OF THE INVENTION

This invention has been made in view of the above circumstances, and an object of the invention is to provide a combination switch in which operating switches for an air-conditioner which is higher in frequency of operation during the travel of a vehicle are provided on an operating lever so that these switches can be easily manipulated during the travel, and also a production cost can be reduced.

In order to achieve the object, in accordance with one or more embodiments of the present invention, a combination switch comprises a combination switch body for being fixed to a steering column of a vehicle; an operating lever swingably mounted on the combination switch body; a wiper switch for operating a wiper of the vehicle in accordance with a swing movement of the operating lever relative to the combination switch body; and an air-conditioner operating portion for operating an air-conditioner of the vehicle mounted on the operating lever.

Further, in accordance with one or more embodiments of the present invention, the air-conditioner operating portion comprises an A/C switch mounted at a distal end of the operating lever, wherein the A/C switch is kept in a depressed position so as to operate the air-conditioner when the A/C switch is depressed, and the A/C switch is returned to an original position so as to stop the air-conditioner when the A/C switch is again depressed; a fan switch that is rotatable about an axis of the operating lever so as to adjust or stop an operation of a fan of the air-conditioner; and a temperature control dial that is rotatable about the axis of the operating lever to control an actuator associated with the air-conditioner so as to control a temperature within a room of the vehicle.

Further, in accordance with one or more embodiments of the present invention, an indicator at a meter panel of the vehicle is lighted when the A/C switch is kept in the depressed condition.

Other aspects and advantages of the invention will be apparent from the following description and the appended claims.

DESCRIPTION OF THE PREFERRED EMBODIMENTS

A preferred embodiment of the present invention will now be described specifically with reference to the drawings.

Figure 1:
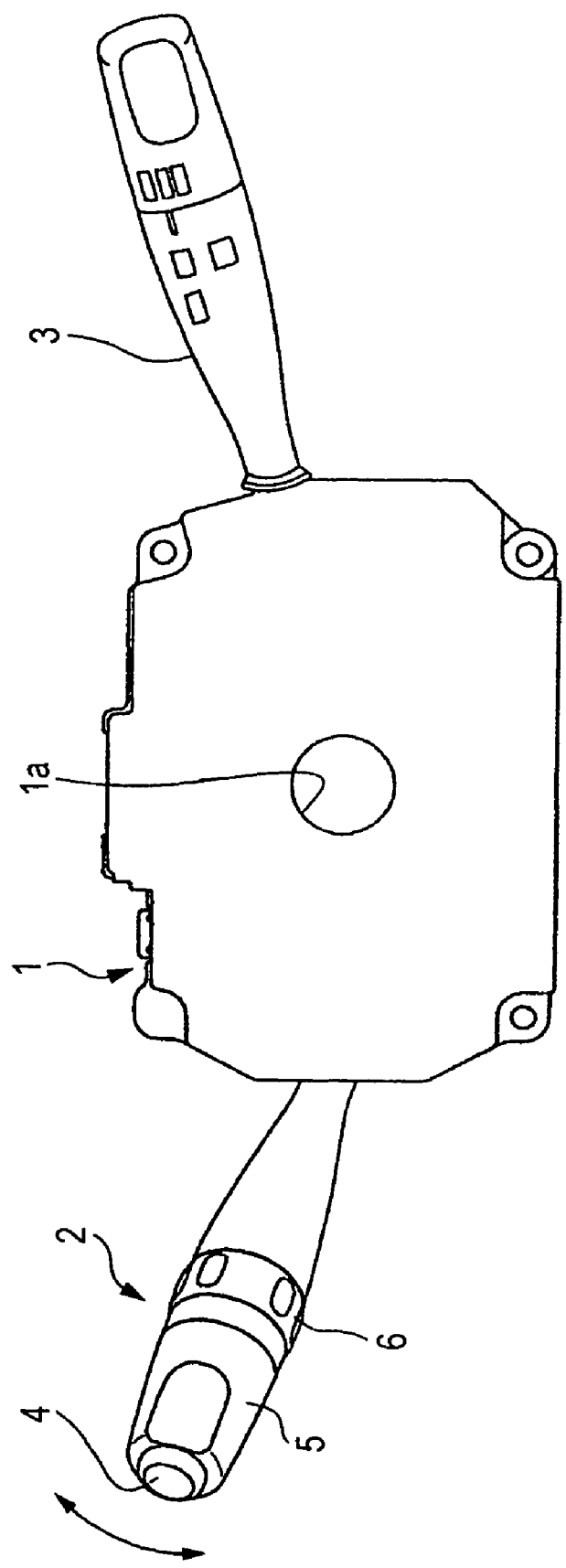
FIG. 1 is a schematic plan view showing an embodiment of a combination switch of the present invention.

A combination switch of this embodiment is fixed to a steering column of a vehicle such as an automobile so as to operate various electrical equipments mounted on the automobile. As shown in FIG. 1, the combination switch mainly comprises a combination switch body 1, and an operating lever 2.

A through hole 1a is formed through a substantially central portion of the combination switch body 1, and a steering pipe (not shown) is passed through the through hole 1a, and the combination switch body 1 is fixed to a stay mounted on the steering pipe by bolts or the like. The operating lever 2 for effecting operations associated with wipers provided on the vehicle is formed on and projects from a left side surface (FIG. 1) of the combination switch body 1. Reference numeral 3 denotes an operating lever for effecting operations associated with lamps provided on the vehicle.

The operating lever 2 is so mounted on the combination switch body 1 that it can be swung in a direction of arrows of FIG. 1 (that is, in a direction substantially parallel to a plane of angular movement of a steering handle), and also can be swung in a direction substantially perpendicular to the direction of the arrows (that is, a direction toward the forward side (i.e., toward the driver) in FIG. 1). When the operating lever 2 is swung in the direction of the arrows, a wiper switch (not shown) is turned on so as to operate the wipers of the vehicle. When the operating lever 2 is pulled toward the forward side to be swung, a washer liquid is injected to a front glass.

Figure 5:
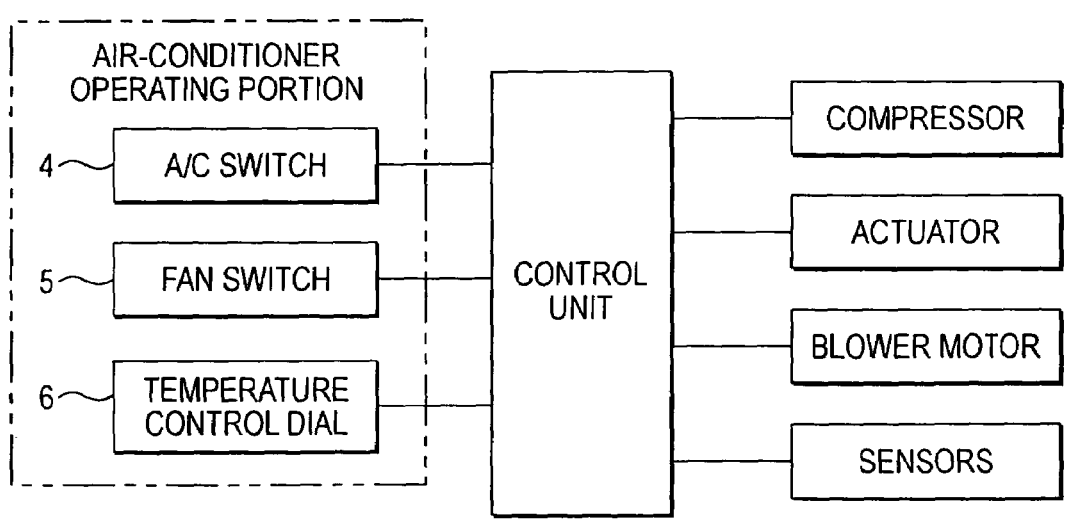
FIG. 5 is a block diagram showing the wiring of the combination switch of the embodiment.

An A/C switch 4 (air-conditioner switch 4), a fan switch 5 and a temperature control dial 6 are formed on the operating lever 2, and these switches form an air-conditioner operating portion for operating an automatic air-conditioner mounted on the vehicle. As shown in FIG. 5, the air-conditioner operating portion is electrically connected to a control unit of the vehicle, and the control unit is electrically connected to a compressor, an actuator, a blower motor and sensors.

Namely, when the driver manipulates the A/C switch 4, the fan switch 5 and the temperature control dial 6 mounted on the operating lever 2, electrical signals are fed to the control unit so as to effect controls corresponding to the manipulations of the switches. The actuator operates a temperature-adjusting damper or the like, and the blower motor adjusts the amount of the air to be blown into a vehicle room. The control unit maybe a control unit of a currently-available air-conditioner to which a program is added, or may be a newly-designed control unit.

Figure 3:
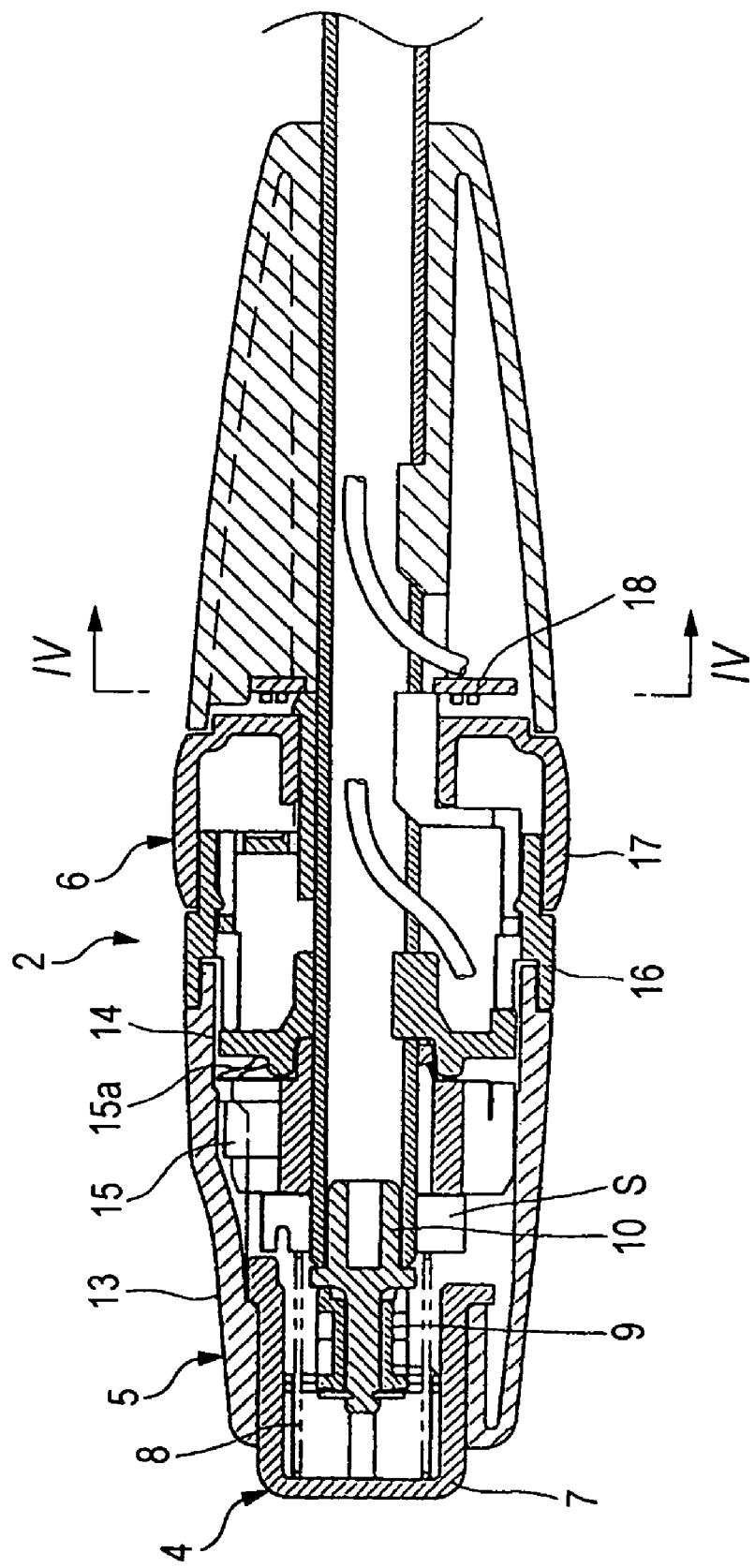
FIG. 3 is a cross-sectional view taken along the line III-III of FIG. 2.

The A/C switch 4 is provided at a distal end of the operating lever 2, and when the A/C switch 4 is depressed, the air-conditioner is operated, with the A/C switch 4 kept in the depressed position. Then, when the A/C switch 4 is again depressed, this switch is returned to an original position, thereby stopping the operation of the air-conditioner. More specifically, the A/C switch 4 can be turned on and off by a mechanical latch mechanism, and this A/C switch 4 mainly comprises a button 7, a spring 8, an action piece 9, and a holder 10 as shown in FIG. 3.

The button 7 is urged left (in FIG. 3) by the spring 8 to project a predetermined distance from the distal end of the operating lever 2. A stopper S is mounted within the operating lever, and is spaced right (in FIG. 3) at a predetermined distance from the button 7. This stopper S limits the movement of the depressed button 7, and a moving contact (not shown) is formed at a right (in FIG. 3) end of the button 7.

A fixed contact is formed within the operating lever 2, and when the button 7 is held against the stopper S, this fixed contact is contacted with the moving contact formed on the end of the button 7. When the moving contact and the fixed contact are contacted with each other, an energized condition is maintained, thereby causing the control unit to drive the air-conditioner. This energized condition (that is, the depressed position) is maintained by the latch mechanism comprising the holder 10 and the action piece 9 which is angularly movable about an axis of the holder 10.

The action piece 9 is formed into a substantially cylindrical shape, and a cam groove (not shown) is formed in an outer peripheral surface of the action piece 9. A projecting portion, extending from the button 7, is fitted in this cam groove, and when the button 7 is depressed, the action piece 9 is angularly moved in accordance with the sliding movement of the button 7. Then, when the button 7 reaches a position where it abuts against the stopper S, the projecting portion is retained by the cam groove, thereby holding the button 7 in its depressed position, so that the energized condition is achieved by contact of the moving and fixed contacts with each other.

When the button 7, kept in the depressed position, is again depressed, the retaining of the projecting portion by the cam groove is canceled, so that the button 7 is returned to the original position by the urging force of the spring 8. As a result, the moving and fixed contacts are moved apart from each other to stop the energization, so that the compressor is stopped via the control unit.

Figure 6:
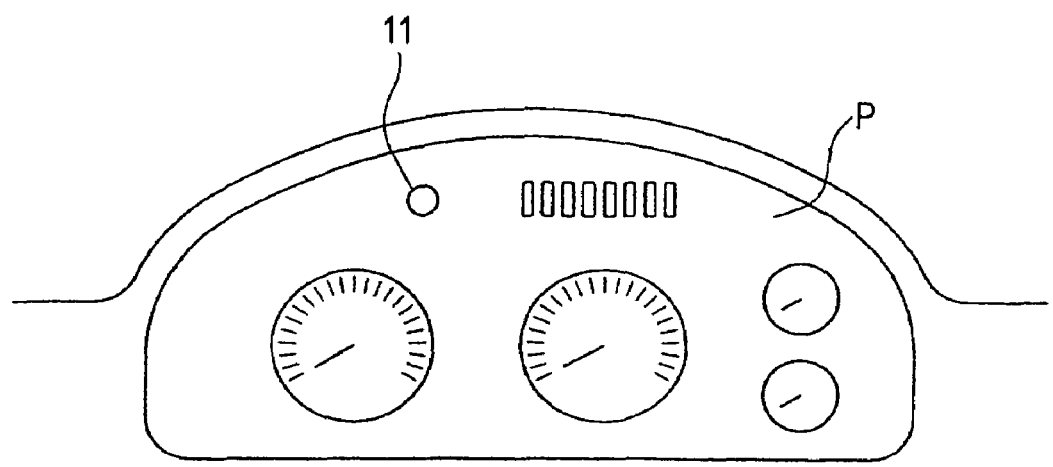
FIG. 6 is a schematic view showing an indicator and temperature setting indication means in the combination switch of the embodiment.

In this embodiment, when the button 7 is kept in the depressed position, an indicator 11, mounted on a meter panel P of the vehicle, is kept to light via the control unit as shown in FIG. 6. This indicator 11 comprises, for example, an LED of a predetermined color, and the lighting of this indicator 11 tells the driver that the air-conditioner is running.

The fan switch 5 is angularly movable about an axis of the operating lever 2, and adjusts or stops the operation of a fan (blower motor) associated with the air-conditioner. As shown in FIG. 3, the fan switch 5 mainly comprises a knob 13, a terminal base 14, and a roller 15. The roller 15 is angularly movable together with the knob 13, and has a tension ball (not show) mounted therein. When the knob 13 is angularly moved, a click feeling is obtained at each of predetermined positions thanks to the provision of the tension ball.

A moving contact 15a is formed on the roller 15, and can be held in sliding contact with a fixed contact (not shown) formed on a left (in FIG. 3) end surface of the terminal base 14. Namely, when the roller 15 is angularly moved in accordance with the angular movement of the knob 13, contact, corresponding to the angular position of the knob 13, is obtained between the moving and fixed contacts, and the blower motor is driven via the control unit according to the angular position of the knob 13. Thus, the amount of the air, blown from the air-conditioner, can be adjusted to a desired level (for example, level 1 to level 3), and can be stopped (the air amount: 0).

Figure 2:
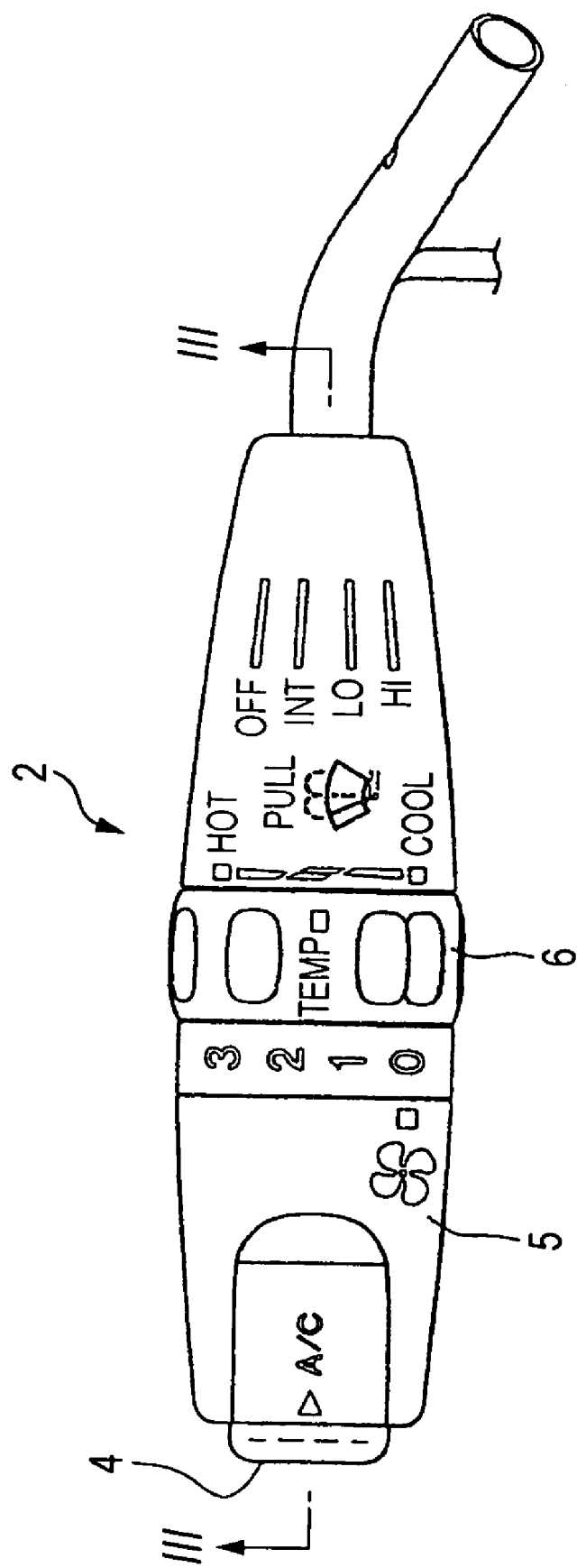
FIG. 2 is a schematic view showing an operating lever of the combination switch of the embodiment.

Like the fan switch 5, the temperature control dial 6 is angularly movable about the axis of the operating lever 2, and this temperature control dial 6 controls the actuator associated with the air-conditioner, thereby controlling the temperature within the vehicle room. The temperature control dial 6 mainly comprises a knob 17, and a terminal 18. A ring 16 is fixedly mounted on the operating lever 2, and is disposed between the knob 13 of the fan switch 5 and the knob 17 of the temperature control dial 6. Numerals, indicative of the levels of adjustment of the fan (blower motor) by the fan switch 5, are indicated on an outer surface of the ring 16 by printing or the like (see FIG. 2).

Figure 4:
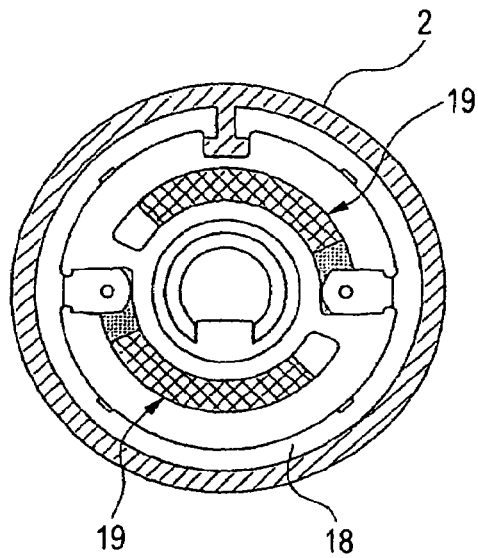
FIG. 4 is a cross-sectional view taken along the line IV-IV of FIG. 3.

A tension ball (not shown) is mounted within the knob 17 to provide a multi-stage click construction by which a click feeling can be obtained in accordance with the angular movement of the knob 17. A moving contact is formed on a right (in FIG. 3) end surface of the knob 17, and can slide on a circuit 19 (see FIG. 4) formed on a left (in FIG. 3) side (face) of the terminal 18. The circuit 19, formed on the terminal 18, is formed into such a shape as shown in FIG. 4, and has a predetermined electrical resistance, and the value of the resistance varies according to the angular position of the moving contact.

Namely, a voltage of a current, flowing through the circuit 19, varies according to the angular position of the knob 17, and therefore the value of this voltage is compared with a voltage outputted from the actuator for operating a temperature control flap, and its rotational direction and position are controlled by the control unit, and by doing so, the actuator is operated in accordance with the position of the knob 17. This control is always effected during the time when electric power is supplied to the control unit (usually, during the time when an engine of the vehicle is driven).

If the knob 17 is angularly moved to change the above set temperature during the time when the engine of the vehicle is stopped (that is, during the time when electric power is not supplied to the control unit), the comparison control relative to the set temperature becomes in accurate. Therefore, preferably, each time the engine is started, a voltage change, depending on the position of the knob 17, is detected so that the actuator can always be operated in accordance with the set position.

In the combination switch of the above construction, the air-conditioner operating portion for operating the air-conditioner mounted on the vehicle is formed at the operating lever 2, and therefore when the driver manipulates the air-conditioner operating portion during the travel of the vehicle, he does not need to direct the eyes much downward, and therefore can easily effect this manipulation during the travel. And besides, instead of mounting rear wiper-operating switches on the operating lever as in the conventional construction, the switches for operating the air-conditioner are mounted on the operating lever, and therefore the production cost of the combination switch can be reduced.

Namely, some kinds of automobiles are not provided with a rear wiper, and it has been necessary that two types of combination switches (that is, the type having rear wiper-operating switches formed on an operating lever and the type having no such wiper-operating switches on an operating lever) should be prepared at a production side. On the other hand, an air-condition is provided at almost all kinds of automobiles, and therefore regardless of whether or not the rear wiper is provided, it is only necessary to prepare one type of combination switch, and thus the common part (combination switch) can be used, so that the production cost can be reduced.

Furthermore, the indicator 11 which is lighted in accordance with the operation of the A/C switch 4 is provided at the meter panel P, and therefore the driving of the air-conditioner can be confirmed without directing the eyes much downward as compared with the conventional construction in which such an indicator is provided at an instrument panel or its vicinity. Therefore, safety can be enhanced.

Although the preferred embodiment of the invention has been described above, the invention is not limited to this embodiment. For example, the air-conditioner which is operated by the air-conditioner operating portion may be an automatic air-conditioner or a semi-automatic air-conditioner.

In the above embodiment, although the indicator 11 for enabling the driver to confirm the driving of the air-conditioner is provided at the meter panel P, this indicating means can be provided at an instrument panel or its vicinity as in the conventional construction. At least one of the A/C switch 4, the fan switch 5 and the temperature control dial 6 which jointly form the air-conditioner operating portion can be mounted on the operating lever, in which case the other switches can be formed at the combination switch.

In the embodiments, the operating switches for the air-conditioner which are higher in frequency of use during the travel of the vehicle are mounted on the operating lever, and therefore the manipulation of these switches can be effected easily during the travel.

In the embodiments, the A/C switch, the fan switch and the temperature control dial are mounted on the operating lever, and therefore almost all of the operating switches usually required for the air-conditioner are provided at the operating lever, and the operation of the air-conditioner can be effected without directing the eyes much downward.

In the embodiments, the indicator, provided at the meter panel of the vehicle, is lighted when the A/C switch is kept in the depressed position, and therefore the operation and stop of the air-conditioner can be confirmed during the travel without directing the eyes much downward.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A combination switch comprising:
    a combination switch body for being fixed to a steering column of a vehicle;
    an operating lever swingably mounted on the combination switch body;
    a wiper switch for operating a wiper of the vehicle in accordance with a swing movement of the operating lever relative to the combination switch body; and
    an air-conditioner operating portion for operating an air-conditioner of the vehicle mounted on the operating lever.

2. The combination switch according to claim 1, wherein the air-conditioner operating portion comprises:
    an A/C switch mounted at a distal end of the operating lever, wherein the A/C switch is kept in a depressed position so as to operate the air-conditioner when the A/C switch is depressed, and the A/C switch is returned to an original position so as to stop the air-conditioner when the A/C switch is again depressed;
    a fan switch that is rotatable about an axis of the operating lever so as to adjust or stop an operation of a fan of the air-conditioner; and
    a temperature control dial that is rotatable about the axis of the operating lever to control an actuator associated with the air-conditioner so as to control a temperature within a room of the vehicle.

3. The combination switch according to claim 2, wherein an indicator at a meter panel of the vehicle is lighted when the A/C switch is kept in the depressed condition.

4. The combination switch according to claim 1, wherein the air-conditioner operating portion is electrically connected to a control unit of the vehicle, and the control unit is electrically connected to a compressor, an actuator, a blower motor and sensors of the air conditioner.

5. The combination switch according to claim 1, wherein the wiper switch is turned on so as to operate the wipers of the vehicle when the operating lever is swung up and down, and
    wherein a washer liquid is injected to a front glass when the operating lever is pulled toward the forward side to be swung.

6. The combination switch according to claim 1,
    wherein the air-conditioner operating portion comprises a temperature control dial including a knob,
    wherein each time an engine is started, a voltage change depending on a position of the knob is detected, and
    wherein an actuator of the air-conditioner is operated in accordance with the position.

* * * * *